Feb. 20, 1940.    M. B. CURLEY    2,191,341
VENTILATOR
Filed Feb. 26, 1937    5 Sheets-Sheet 1
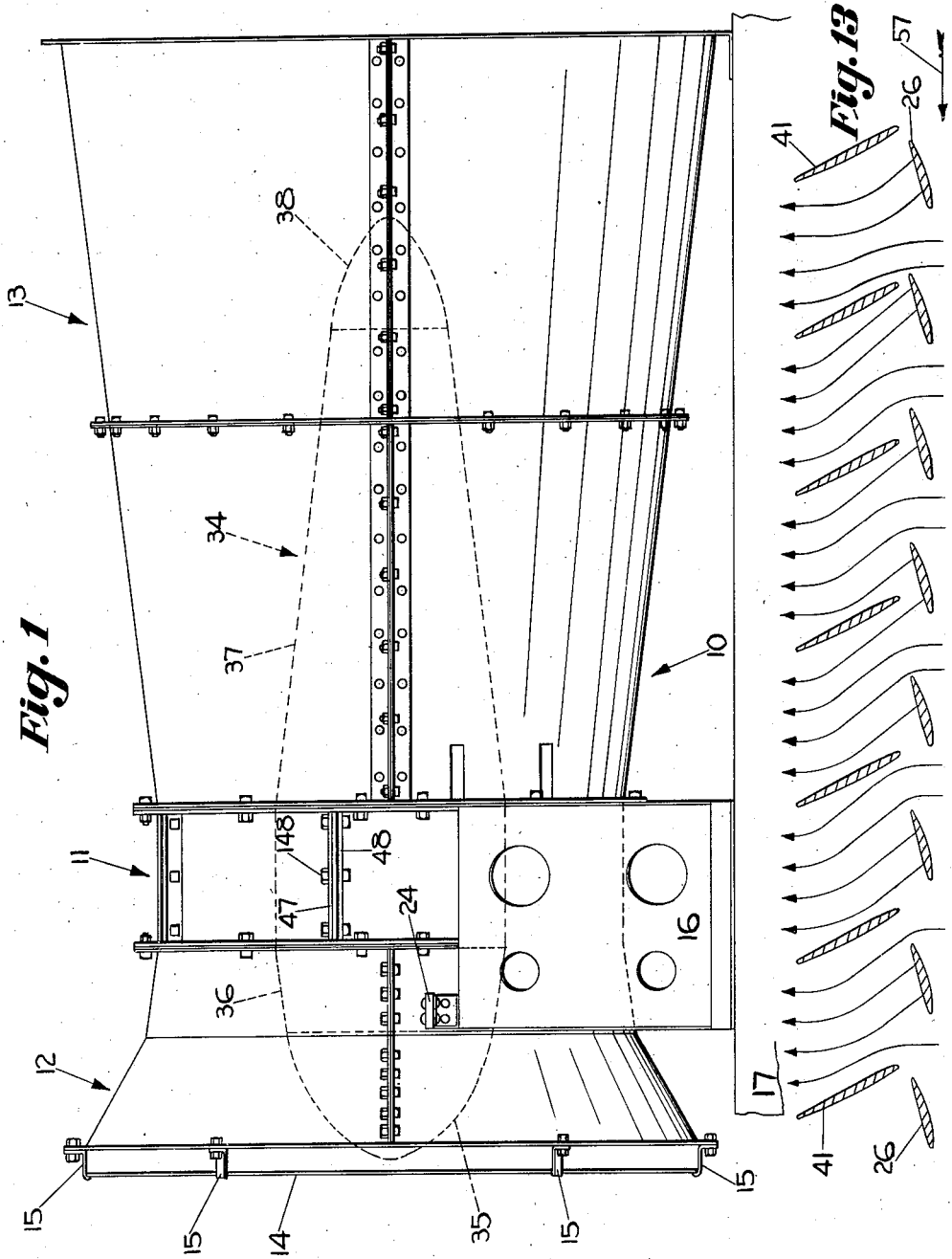
INVENTOR:
MORTON B. CURLEY,
BY
Chas. M. Nissen,
ATTY.

Feb. 20, 1940.   M. B. CURLEY   2,191,341
VENTILATOR
Filed Feb. 26, 1937   5 Sheets-Sheet 2
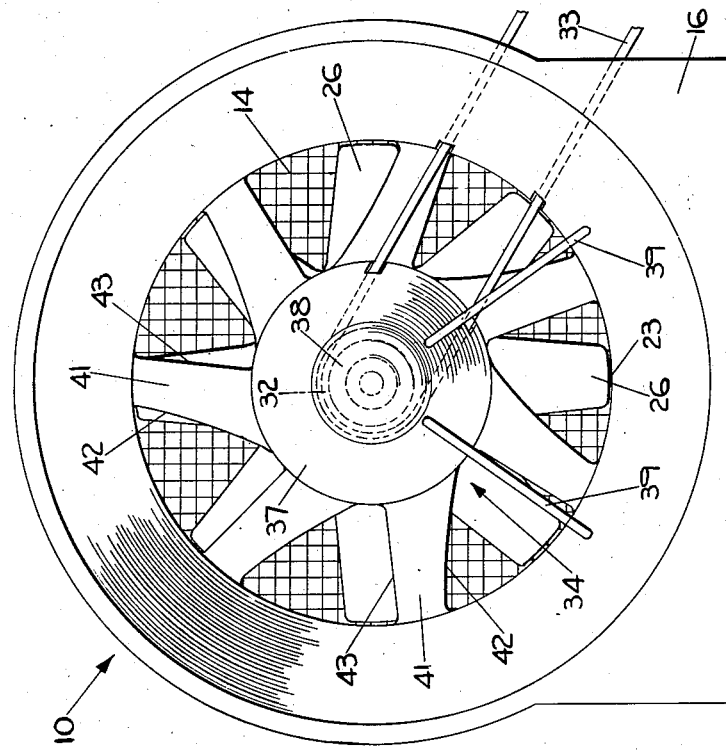
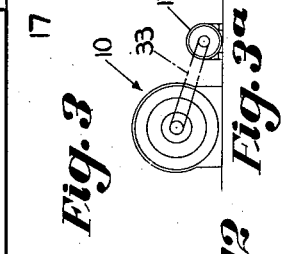
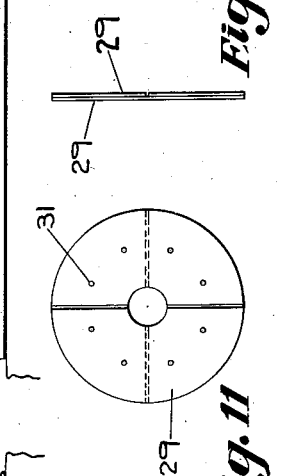
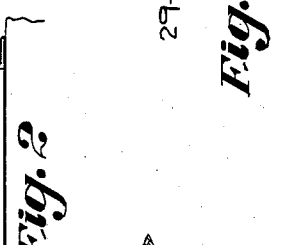
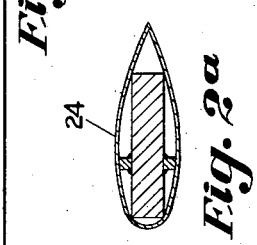
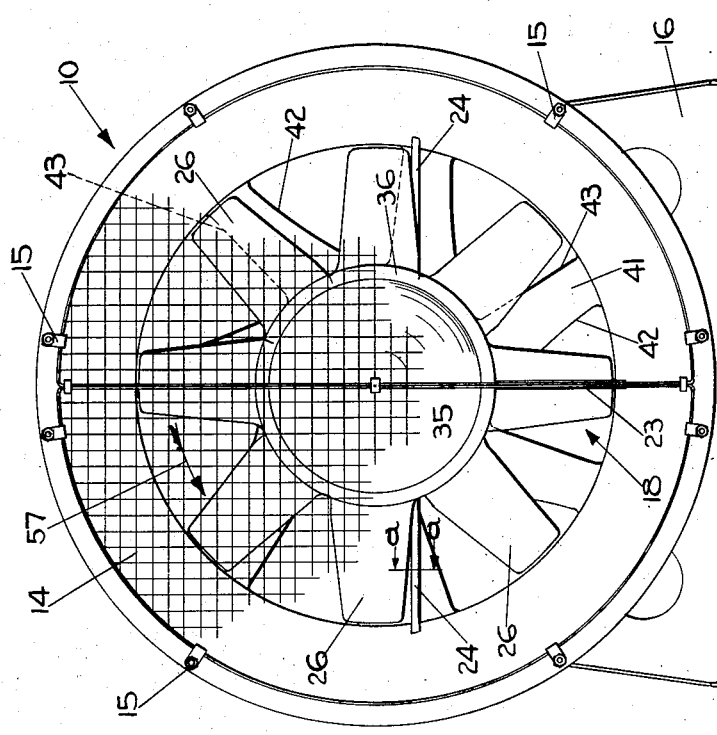
INVENTOR:
MORTON B. CURLEY,
By
Chas. M. Nissen,
ATT'Y.

Feb. 20, 1940.  M. B. CURLEY  2,191,341
VENTILATOR
Filed Feb. 26, 1937  5 Sheets-Sheet 3
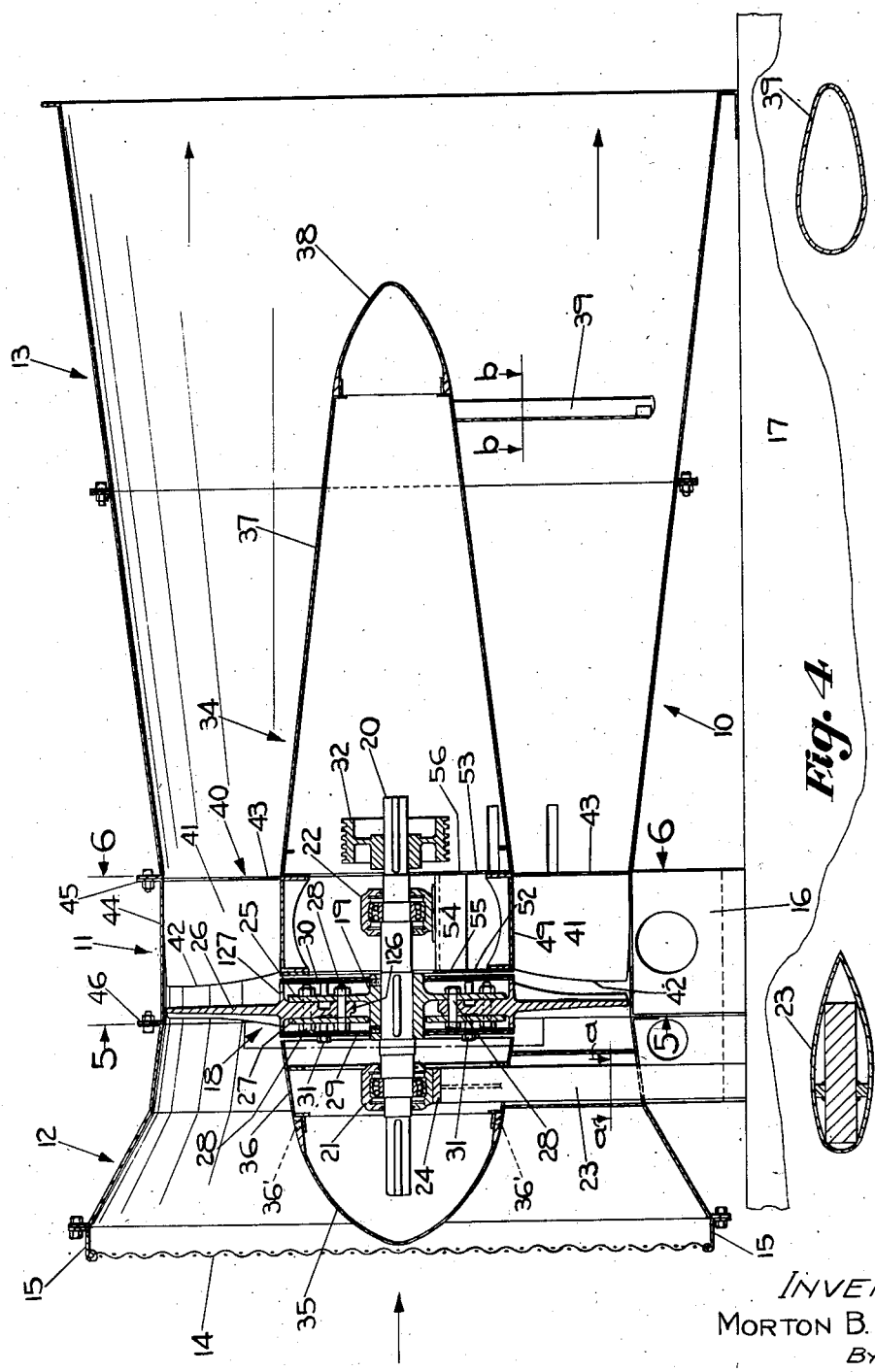
INVENTOR:
MORTON B. CURLEY,
BY
Chas. M. Nissen,
ATT'Y Feb. 20, 1940. M. B. CURLEY 2,191,341
VENTILATOR
Filed Feb. 26, 1937 5 Sheets-Sheet 4

INVENTOR:
MORTON B. CURLEY,
By
Chas. M. Nissen,
ATTY

Feb. 20, 1940.    M. B. CURLEY    2,191,341
VENTILATOR
Filed Feb. 26, 1937    5 Sheets-Sheet 5
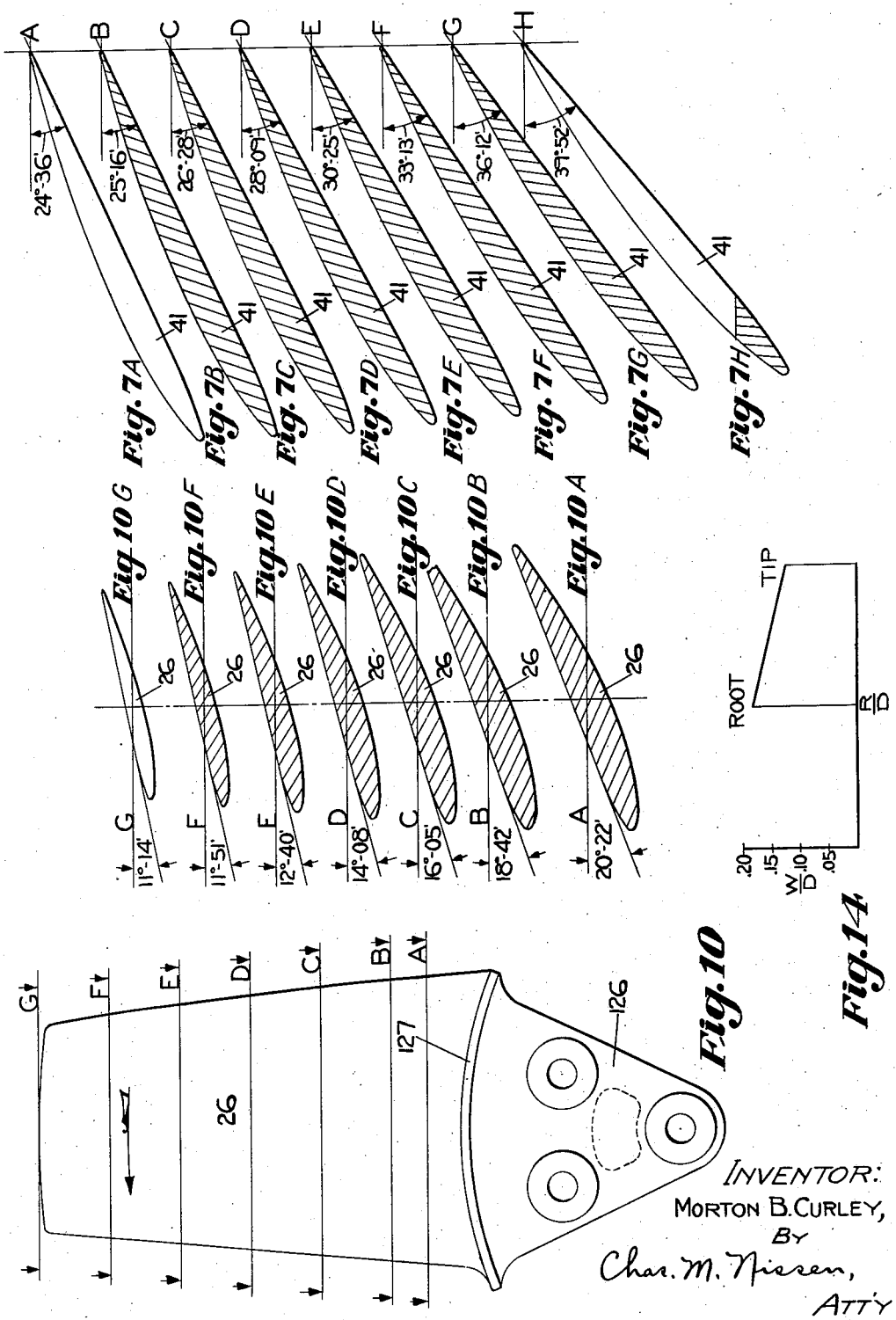
INVENTOR:
MORTON B. CURLEY,
BY
Chas. M. Nissen,
ATTY Patented Feb. 20, 1940

2,191,341

UNITED STATES PATENT OFFICE 2,191,341

VENTILATOR

Morton B. Curley, Columbus, Ohio, assignor to The Jeffrey Manufacturing Company, a corporation of Ohio Application February 26, 1937, Serial No. 127,897

21 Claims. (Cl. 230—120)

This invention relates to a ventilator or fan and particularly to such a device as is used in connection with the ventilation of coal mines.

An object of the invention is to provide an improved device of the above mentioned class in which guide vanes are provided which are formed as castings with integral cylindrical segments at each end to form cylindrical portions of the fan casing and cowling, respectively.

Another object of the invention is to provide a casting forming a guide vane with a pair of segments of cylinders at each end which subtend equal angles, but which have their radial center lines spaced apart.

Still another object of the invention is to provide a very rigid but simple construction for a fan, and particularly for the guide vanes thereof, which allows of a plurality of guide vanes of unequal number being formed by identical castings.

Another object of the invention is to provide an improved fan rotor construction.

Other objects of the invention will appear hereinafter, the novel features and combinations being set forth in the appended claims.

In the accompanying drawings,

Fig. 1 is a side elevational view of the device comprising my invention;

Fig. 2 is a front elevational view of the device of Fig. 1;

Figure 5:
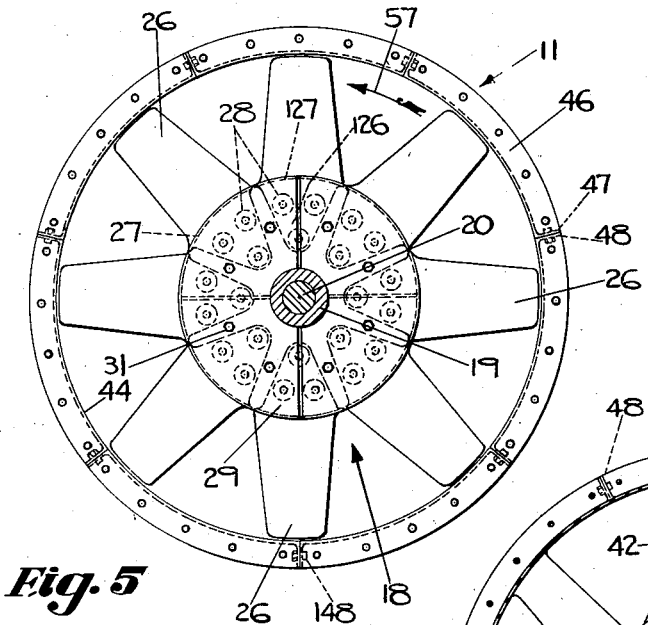
Figure 9:
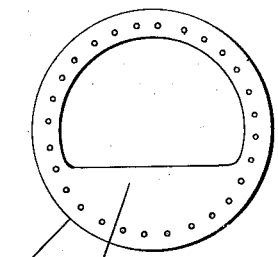
Figure 6:
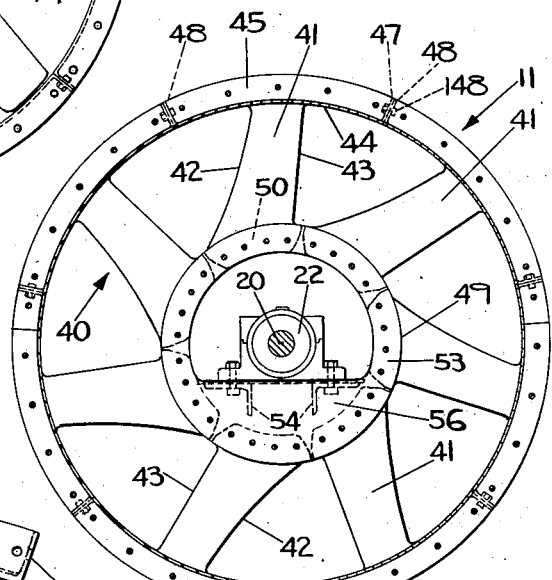
Figure 7:
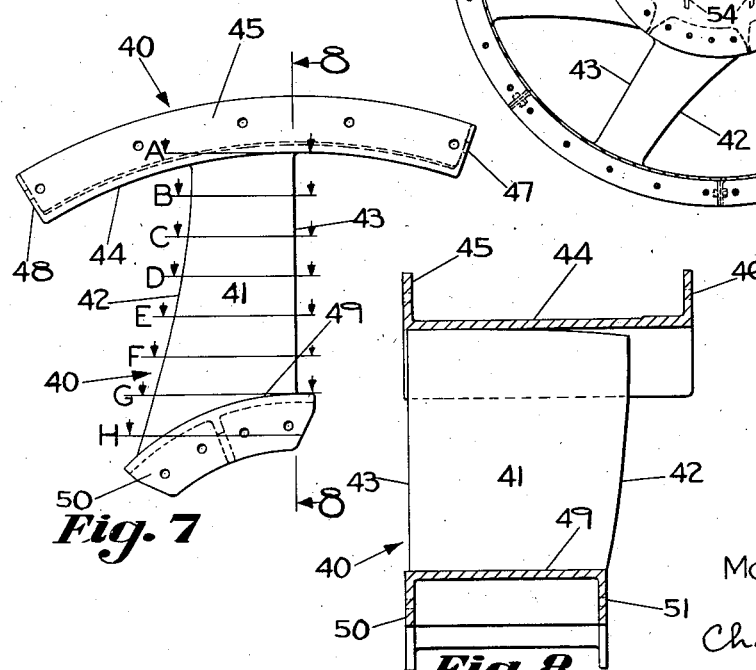
Figure 8:
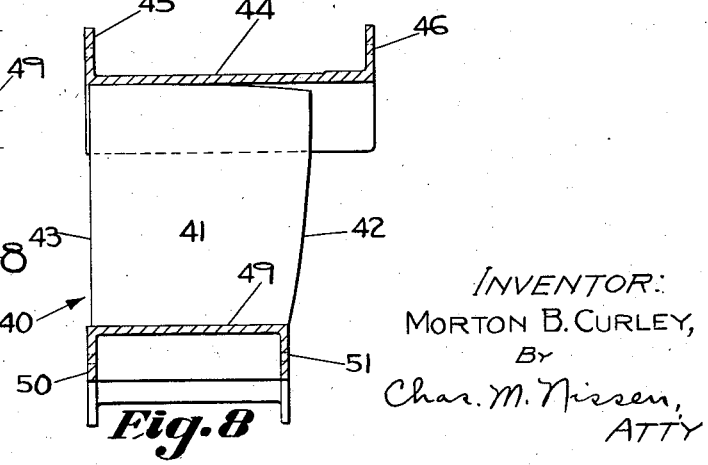

Fig. 2ª is a sectional view taken on line a—a of Fig. 2 looking in the direction of the arrows;

Fig. 3 is a rear elevational view of the device of Fig. 1;

Fig. 3ª is a diagrammatic elevational view of the device and the drive means therefor;

Fig. 4 is a longitudinal vertical sectional view of the device of Fig. 1;

Figs. 4ª and 4ᵇ are sectional views taken on lines a—a and b—b, respectively, of Fig. 4 looking in the direction of the arrows;

Fig. 5 is a partial sectional view taken on the line 5—5 of Fig. 4, looking in the direction of the arrows;

Fig. 6 is a partial sectional view taken on the line 6—6 of Fig. 4, looking in the direction of the arrows;

Fig. 7 is a rear view of one of the castings which includes a guide vane;

Figs. 7A to 7H, inclusive, are sectional views on the lines A to H, respectively, of Fig. 7, looking in the direction of the arrows;

Fig. 8 is a sectional view taken on the line 8—8 of Fig. 7, looking in the direction of the arrows;

Fig. 9 is a plan view of a detail comprising a plate;

Fig. 10 is a plan view of a rotor blade;

Figs. 10A to 10G, inclusive, are sectional views on the lines A to G, respectively, of Fig. 10, looking in the direction of the arrows;

Fig. 11 is a plan view of a segmental plate;

Fig. 12 is a side view of said plate;

Fig. 13 is a developed sectional view of the rotor blades and guide vanes made by a complete circle approximately midway between the roots and tips thereof; and Fig. 14 is a curve showing an important characteristic of the blades comprising my invention.

In the construction of a fan or ventilator, particularly of the type employed for ventilating mines, it is desirable to have a fan with guide vanes to cause the movement of the air through the fan to be along longitudinal lines without any appreciable rotary motion. To obtain the most satisfactory operation, and particularly to reduce noise and increase the fan efficiency, it is desirable that the number of guide vanes differ from the number of fan blades, and preferably there is one less guide vane employed than there are blades on the fan rotor. Generally, I provide the fan rotor with an even number of blades, as a consequence of which there will be an odd number of guide vanes. In the illustrated embodiment of my invention I provide a rotor with eight fan blades and a casing with seven guide vanes. This provision of an odd number of guide vanes presents a problem of design whereby the guide vanes may be built up of elements of identical construction, particularly where these elements are in the form of castings. It has been found that a casting is particularly suitable as a guide vane because of the uniformity which can be realized, together with the relatively low cost of quantity production.

In the herein disclosed embodiment of my invention it will be seen that the guide vanes are formed by identical castings and are also formed integral with portions of the fan or ventilator casing and the cowling for the hub of the fan rotor.

In addition to the above mentioned structural problem presented by a fan or ventilator, it is always desirable to increase the efficiency thereof. I have found an important relation between the blade width of a section at any radius and the value of said radius which contributes greatly to the efficiency of the fan. I have also found that a predetermined variation in blade angle between the root and tip contributes to improved efficiency and that in cooperation with said blade, guide vanes having a constant width and a particular variable angle further contribute to increased efficiency.

Referring particularly to Figs. 1 to 4, inclusive, of the drawings, the ventilator or fan comprises a casing or shell 10 formed by a central cylindrical casing portion 11, a converging entrance portion 12 and a diverging outlet portion 13. Said casing portions 11, 12 and 13 are all provided with appropriate peripheral flanges by which they are all connected together, as by nuts and bolts, to provide the complete casing or shell 10. The entrance portion 12 is preferably provided with a removable screen 14 held in place by appropriate clamps 15 to prevent the entrance of any large foreign matter or animals into the fan. The casing or shell 10 is mounted upon a base 16 adapted to rest upon an appropriate foundation 17.

Within the casing and adapted for rotation adjacent the forward portion of the central casing portion 11, I provide a rotor 18 comprising a hub 19 mounted upon a shaft 20 carried in appropriate anti-friction bearings 21 and 22 of which bearing 21 is mounted upon a central standard 23 of streamline form (see Fig. 4ᵃ) braced against lateral movement by a transversely extending bar 24 which is rigidly attached to the base 16 and is also of stream-line form (see Fig. 2ᵃ). The support for the bearing 22 will be described hereinafter.

Rigidly attached to an integral disc 25 of the hub 19 is a plurality of fan blades 26, of which there are eight in the illustrated embodiment of my invention. Each of said blades 26 is provided with an attaching foot 126 by which it is clamped and attached to the disc 25 by a removable clamping or retaining disc 27 and appropriate bolts 28. Disc 27 also prevents bending in the disc 25. This allows for higher tip speeds with higher pressures than heretofore possible, without requiring an unusually heavy hub.

Each of said blades 26 also includes an integral forwardly and rearwardly extending flange 127 which forms a segment of a cylinder. As clearly seen in Figs. 4 and 5 of the drawings the segmental flanges 127 of the eight blades 26 cooperate to form a continuous cylinder at the base of the effective portion of each blade 26, or root thereof, which forms a continuation of the hereinafter described cowling which cooperates to produce the high efficiency of the fan.

Clamped rigidly with the hub disc 25 by bolts 31 are front and rear cover plates 29 and 30, respectively, which have their peripheral edges in close contact with the edges of flanges 127 to provide a drum type central portion for the rotor 18 to reduce rotary wind losses to a minimum.

The cover plates 29 and 30 are constructed to permit their ready removal without removing shaft 20 and are formed of two stacked split discs formed by four split disc segments each, the front discs being split on a line 180 degrees from that of the rear discs, as seen in Figs. 11 and 12 of the drawings. When bolted together by bolts 31 the segments cooperate to form the complete plates 29 and 30. The cover plates 29 and 30 cooperate with the flanges 127 to provide an enclosing drum housing for the feet of blades 26, plate 27, disc 25 and the nuts on bolts 28, thereby preventing the latter causing frictional wind losses; which results in increasing the fan efficiency.

The hub 19 is appropriately keyed to the shaft 20, and the shaft 20 carries a drive pulley 32 at its rear end adapted to be driven from the motor 133 by the plurality of V-belts 33, as shown in Figs. 3 and and 3ᵃ.

A stream-line fixed and stationary cowling 34 is provided for the hub portion of the rotor 18 to increase the efficiency of the fan to a maximum. This cowling 34 comprises a front hollow nose portion 35, preferably made as a casting or spinning of an aluminum alloy, which is supported by means of a plurality of circumferentially spaced screws 36′ attached to a portion 36. This portion 36 preferably has the shape of a frustum of a cone as shown in Fig. 4 and is supported from the standard 23 and the bar 24 by being rigidly secured thereto in stationary position. The portions 35 and 36 provide a stationary or fixed cowling in front of the hub of rotor 18. Immediately to the rear of the rotor 18 there is provided a cylindrical portion 49 of the stationary cowling 34 which is formed by structure which will be described in full detail hereinafter. This cylindrical portion 49 is followed by a portion 37 having the shape of an elongated frustum of a cone which carries a cap or hollow tail closure 38 at its rear end, preferably formed of the same material as is the nose portion 35. The frusto-conical portion 37, as shown in Fig. 4, is supported at its rear end by a pair of stream-line formed legs 39 (see Fig. 4ᵇ) which are attached to the portion 13 of the casing 10.

Immediately to the rear of the rotor 18 is a plurality of castings 40 shown in detail in Figs. 7, 7A to 7G, inclusive, and 8, each of which forms a guide vane 41 having a leading edge 42 and a trailing edge 43 which is on a radial line passing through the axis of shaft 20. Each of said castings 40 also has an integral portion 44 at the outer end of the guide vane 41 forming a segment of a cylinder, which portion 44 is provided with flanges 45, 46, 47 and 48 along each edge thereof. Each of said castings 40 also has an integral portion attached to the inner end of the guide vane 41 forming a cylindrical segment 49 provided with flanges 50 and 51.

As clearly seen in Fig. 6 of the drawings, I provide seven of the castings 40, thus providing seven guide vanes 41 for the rotor 18 which has eight blades 26. The seven castings 40 are attached rigidly together by appropriate bolts 148 passing through the contacting flanges 47 and 48 of adjacent castings 40 whereby the portions 44 form a continuous cylinder and form the central casing portion 11 of the casing 10. The cylindrical segments 49 are bolted rigid to a pair of plates 52 and 53 which are of similar construction, plate 52 being illustrated in detail in Fig. 9 of the drawings. It is thus seen that the seven castings 40 cooperate to provide a central cylindrical portion of the cowling 34, a central cylindrical portion 11 of the casing 10 and a plurality of guide vanes 41 to cause straight-line flow of the air through said casing 10, as illustrated in Fig. 13.

It is also to be noted that the castings 40 cooperate to provide a support for the anti-friction bearing 22 through the plates 52 and 53 between which extends a pair of angle members 54 to which is rigidly attached the housing for said bearing 22, said angle members 54 being welded at their ends to the webs 55, 56 of said plates 52, 53.

By reference to Figs. 6 and 7 of the drawings, it will be noted that the segments 44 and 49 subtend equal angles at the center of the cylinders which they cooperate to form. In the illustrated embodiment of my invention this angle will be one-seventh of a complete circle, or one-seventh of 360 degrees. It is also to be noted that due to the particular form of the guide vane 41 radial center lines which pass through the centers of the segments 44 and 49 will be out of alignment, or in other words, will be angularly spaced apart. This particular construction, of course, provides for making the castings 40 all identical whereby each casting will provide a complete guide vane in itself, thus insuring the entire uniformity of the several guide vanes of the complete fan or ventilator.

It may be mentioned that fans or ventilators of approximately any size may be manufactured and a size range of four foot to ten foot diameters is illustrative of the range which I have constructed at the present time.

Attention is now directed to Figs. 10, 10A to 10G, inclusive, and Fig. 14 of the drawings and to the construction of the rotor 18 and particularly the individual blades 26 thereof.

I prefer to make each of the blades 26 of such length that the working portion thereof, from the root, as formed by flanges 127, to the tip, is approximately one-half the radius of the fan. That is, the fan diameter, which is the diameter of the circle circumscribed by the tips of the blades during rotation, is twice the diameter of the cylinder formed by flanges 127.

As clearly illustrated in Figs. 10A to 10G, inclusive, the fan blade 26 has an airfoil section and the blade angle varies along the planes A to G, inclusive, of Fig. 10 as illustrated in Figs. 10A to 10G, inclusive.

It may be stated that Figs. 10, 10A to 10G, inclusive, 7, and 7A to 7H, inclusive, are drawn to scale and represent a five foot fan. Therefore, the distance from the root of blade 26, as determined by flanges 127, to the tip thereof is fifteen (15) inches. Section A is 1.25 inches from the root and sections B, C, D, E, and F are 2.5, 5, 7.5, 10 and 12.5 inches from said root, respectively, section G being at the tip. Figs. 10A to 10G, inclusive, clearly illustrate the blade angles for each section A to G, respectively, of Fig. 10, and I have found the blade angles illustrated to be the best available. These angles are not specific to a five (5) foot fan, but are general for fans of different sizes. That is, by dividing the effective portion of any blade from the root to the tip into six equal divisions represented by planes B to G, inclusive, drawn at right angles to the radial line thereof, the blade angles represented by Figs. 10B to 10G, respectively, would apply. Fig. 10A would also apply to a section on plane A half-way between plane B and the blade root. Said blade angles along planes A to G, inclusive, are 20°—22′, 18°—42′, 16°—05′, 14°—08′, 12°—40′, 11°—51′ and 11°—14′, respectively. These angles are also general, as to the number of blades and apply to fans of six, eight or any other number of blades.

I have found that improved efficiency is obtained by the blades 26 having a predetermined width along each plane A to G, as illustrated by Fig. 14 of the drawings. In this curve the ordinate is $$\frac{W}{D}$$

in which W is the blade width on any plane similar to planes A to G, inclusive, of Fig. 10, and D is the fan diameter, a constant for any given fan. The abscissa of the curve is R/D, in which R is the shortest distance between the axis of rotation of the blade 26 and the plane on which the blade width is measured; or, in other words, the radius of the smallest circle touching the plane which has its center coincidental with the axis of rotation of blade 26, and D is again the fan diameter. Except for the evaluation of the curve points, the curve of Fig. 14 equally well represents W as the ordinate and R as the abscissa, since the denominator D is common, as represented. In other words, the curve of Fig. 14 is also representative of the variations of the blade width of any section with the radius thereof, from the root of the blade to the tip. It is to be particularly noted that this curve is a straight line. It may therefore be stated that the blade width of a section at any radius is less than the width of the section at the root of the blade by an amount directly proportional to the increase in radius at which the section lies over the radius of the root.

The actual values of W/D which can be derived from Fig. 14 show a value of .1875 at the root and .1250 at the tip, which is a typical illustration, but these limits are not always chosen, and are varied in accordance with various factors. These values are, however, general as to fan size. That is, they apply to fans of any size. Both extreme values will generally be increased where either a higher pressure is desired for the same tip speed and number of blades; or a fewer number of blades are employed and the tip speed and pressure is maintained constant. In some cases, the tip value of W/D may be the same for either condition above mentioned and only the root value of W/D changed.

It may also be mentioned that for increased pressures at the same tip speed, the root distance is preferably increased, that is, the distance from blade root to tip is less than half the fan radius.

As above indicated, the important general condition is that for all fans the curve illustrating blade section width plotted against blade section radius is a straight line and decreases from the blade root to the blade tip.

Reverting to the above mentioned blade angles ilustrated in Figs. 10A to 10G, inclusive, it has been found that maximum efficiency is produced by their selection, and that the blade angle of any section is such that the product of the lift coefficient of the section, times the width of the section, times the resultant of the velocities of the section and the fluid is approximately constant when the fan is delivering the volume of fluid at which the fan efficiency is a maximum.

It may also be mentioned, that the maximum tip speed of the blades 26 is preferably 25,000 feet per minute for any fan, regardless of size. With the fan disclosed, pressures as high as six inches of water have been obtained.

It may also be mentioned, that with my fan the maximum horse-power for the fan is realized at zero volume. As a consequence, the maximum load which the fan can place on the driving motor 133, is definitely limited by the inherent power characteristics of the fan and thus the motor cannot become overloaded and burned out.

Attention is now directed to Figs. 6, 7, 8 and 7A to 7H, inclusive, and to the particular construction of the guide vanes 41. Figs. 7A to 7H, inclusive, are sections along planes A to H, inclusive of Fig. 7, ignoring all parts except the vane 41 or its projection.

Each vane section is an airfoil section of the same shape and size. The trailing edge 43 of each vane 41 is along a radial line passing through the axis of shaft 20. The width of each section A to H of Fig. 7, inclusive, as illustrated in Figs. 7 and 7A to 7H, inclusive, is the same. The particular curvature seen on the leading edge 42 of each vane, as seen in front elevation in Fig. 6, is due to the fact that each section has the same width, the trailing edge 43 of each section is on a radial line and the sections on planes A to H, inclusive of Fig. 7, may be different angles with a plane passing through the axis of shaft 20, as illustrated in Figs. 7A to 7H, inclusive, of the drawings. For the various planes A to H, inclusive, the vane angles are 24°—36′, 25°—16′, 26°—28′, 28°—09′, 30°—25′, 33°—13′, 36°—12′ and 39°—52′, respectively. These angles have been determined by experiment and are such that the guide vanes make a small angle, not more than 12 degrees or less than 5 degrees, to the direction of flow of the fluid as it leaves the fan blades.

Fig. 13, which is a development of a section formed by a cylinder cutting the blades 26 and guide vanes 41 about midway between the blade root and tip, shows the relation of blades and guide vanes and the path of travel of the fluid. The direction of rotation of the blades 26 is indicated by the arrow 57.

The guide vane sections illustrated are general to fans of different sizes but are otherwise specific to the eight blade fan illustrated. A fan having a different number of blades would require different guide vanes. For the eight blade fan illustrated it may be stated that the product of the width of a guide vane section and the number of guide vanes is equal to approximately 1.80 times the diameter of the fan. From this relation the width of a guide vane section, which is the same for all sections on planes A to H, inclusive, is determined, after the number of guide vanes is selected. As previously indicated, it is very desirable, in the interest of low noise and high efficiency that the number of guide vanes and the number of fan blades have no common factor. Preferably there is one less guide vane than fan blade, though in some cases with large size fans I use a number of guide vanes which is twice the number of fan blades less one.

In the operation of the fan the rotor 18 will be rotated in the direction of the arrow 57 seen in Figs. 2, 5 and 13 of the drawings, and will drive air through the fan casing 10 from the left to the right, as viewed in Fig. 4 of the drawings and along the paths of the arrows in Fig. 13. It will, of course, be evident that due to the rotary motion of the rotor 18 there will be a tendency for the air to rotate as well as travel longitudinally through the casing 10. The guide vanes 41 will be effective to prevent appreciable rotation of the air and to cause it to move rectilinearly through said casing 10, leaving the influence of the guide vanes 41 over the whole area at once due to the radial positioning of the trailing edges 43 thereof.

Due to the stream-line construction of the casing 10, the cowling 34 and the supports 23, 24 and 39, losses will be reduced to a minimum; this, coupled with the particularly efficient fan blade and guide vane construction produces a fan having a very high efficiency which, in practice, has been found to be as high as eighty-five percent.

It is also possible to reverse the direction of rotation of the fan and thus reverse the direction of movement through it. However, this is intended only for an emergency condition because the efficiency of the fan is not as high when operating in the reverse direction, as the blades 26 and guide vanes 41 are designed for most efficient rotation in one direction of rotation of rotor 18.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a fan, the combination with a casing, of a rotor having fan blades, and a plurality of identical guide vanes each formed as a casting having an integral hub and integral peripheral cylindrical segment, said hub and peripheral segments having their central axial lines out of alignment with each other and cooperating to provide continuous hub and casing cylinders.

2. In a fan, the combination with a casing, of a rotor having fan blades and a central hub, and means providing guide vanes, a hub drum and a cylindrical casing portion, said means comprising a plurality of similar elements each formed with a hub and a peripheral arcuate flange having radial axes offset relative to each other and a guide vane rigidly connecting them together.

3. A fan assembly comprising an outer casing and a central cowling, guide vanes connecting said casing and cowling, each of said guide vanes being formed as a casting integral with cylindrical segments at each end having radial axes offset relative to each other, the segments at the outer ends of said guide vanes forming a continuous cylindrical section of said casing and the segments at the inner ends of said vanes forming a continuous cylindrical section of said cowling.

4. A fan assembly comprising an outer cylinder, an inner cylinder and a plurality of guide vanes, each guide vane being rigidly attached to a segment forming part of said outer cylinder and a segment forming part of said inner cylinder, said segments attached to a common guide vane subtending equal angles at the center of said cylinders and having center lines which are out of alignment with each other.

5. As an article of manufacture, a casting for a fan structure forming a guide vane with an integral cylindrical segment at each end, said segments having their radial center lines out of alignment with each other.

6. A fan rotor comprising a hub having an integral disc, fan blades having feet, a continuous disc unattached to said hub, means extending through said hub disc, blade feet and continuous disc and clamping them together, said blade feet being between the hub disc and continuous disc, said continuous disc preventing bending of said hub disc when said rotor rotates at a high speed.

7. A fan rotor comprising a plurality of blades having segments of a cylinder carried thereby which cooperate to form a complete cylinder, a hub, means attaching said blades to said hub, a plate extending between said hub and said cylinder, said plate being formed in four parts forming a pair of stacked split discs which are split on lines which are out of alignment.

8. A fan rotor comprising a hub, a plurality of fan blades having feet, means attaching said feet to said hub, and cover means for said feet comprising a pair of stacked split discs, split on diametrical lines which are out of alignment.

9. A fan rotor comprising a hub having an integral disc, a plurality of fan blades each having a working portion and an attaching foot separated by forwardly and rearwardly extending flanges formed as a segment of a cylinder, said segments cooperating to form a cylinder, means attaching said feet to said integral disc including bolts, and means including plates on opposite sides of said disc and extending between said hub and cylinder to provide a drum housing for said feet and attaching bolts.

10. A fan rotor comprising a hub having an integral disc, a plurality of fan blades each having a working portion and an attaching foot separated by forwardly and rearwardly extending flanges formed as a segment of a cylinder, said segments cooperating to form a cylinder, means attaching said feet to said integral disc including bolts, and means including plates on opposite sides of said disc and extending between said hub and cylinder to provide a drum housing for said feet and attaching bolts, said plates being constructed and arranged for removal while the rotor is mounted in rotating position.

11. A fan rotor comprising a plurality of blades in which the effective blade length is approximately one-fourth the rotor diameter and in which the blade angle increases from approximately 11°—14' at the tip to approximately 20°—22' at a section one-twelfth the effective blade length removed from the root.

12. In a fan, the combination with a casing, of a rotor having eight blades in said casing, a plurality of guide vanes in said casing, said guide vanes being so constructed that the product of the width of any section on a plane at right angles to a radial line along the trailing edge thereof, times the number of guide vanes is equal to approximately 1.8 times the diameter of the fan.

13. In a fan, the combination with a rotor having a plurality of blades in each of which the blade angle varies from approximately 11°—14' at the tip to 20°—22' in a plane one-twelfth the active blade length removed from the root, of guide vanes associated therewith each having a uniform section and having vane angles varying from approximately 24°—36' to 39°—57' from the tip to approximately the root, said vane angles being measured from a plane passing through and parallel with the axis of rotation of said rotor.

14. As an article of manufacture, an element of a fan structure forming a guide vane with a permanently attached cylindrical segment at each end, said segments having their radial center lines out of alignment with each other.

15. As an article of manufacture, an element for a fan structure forming a guide vane with a permanently attached curve-surfaced segment at each end, said segments having their radial center lines out of alignment with each other, said outer segment having radially extending connecting flanges on its edges.

16. A fan casing comprising a converging inlet portion, a cylindrical central portion, and a diverging outlet portion, said central portion being formed of a plurality of similar elements each having a radial guide vane extending toward the center of said casing and a permanently attached segmental portion at the outer end thereof, the segmental portions of said elements having radial flanges for attachment to adjacent segmental portions and to said inlet and outlet portions of said casing, and means for attaching said flanges as aforesaid.

17. A fan casing comprising a converging inlet portion, a central portion, and a diverging outlet portion, said central portion being formed of a plurality of similar elements each having a radial guide vane extending toward the center of said casing and a permanently attached segmental portion at the outer end thereof, the segmental portions of said elements having radial flanges for attachment to adjacent segmental portions and to said inlet and outlet portions of said casing, and means for attaching said flanges as aforesaid.

18. As an article of manufacture, an element of a fan structure forming a guide vane with a permanently attached segment at each end, said segments providing spaced apart curved surfaces facing each other, the radial center lines of which are offset with respect to each other.

19. As an article of manufacture, an element of a fan structure forming a guide vane with a permanently attached segment at each end, each segment having a curved surface adjacent the face attached to said guide vane and being so formed that a plane passing through oppositely positioned points cuts a concentric arc on each, said arcs having their radial center lines offset with respect to each other.

20. A fan rotor comprising a hub having an integral disc, fan blades having attaching bottom portions, a continuous disc separate from said hub, said bottom portions of said blades extending between said integral disc and said continuous disc, means attaching said continuous disc and said integral disc together and to said bottom portions while clamping said bottom portions between said discs including bolts extending through both of said discs, said continuous disc preventing bending of said integral disc when said rotor rotates at a high speed.

21. A fan rotor comprising a hub having an integral disc, fan blades having attaching bottom portions, a continuous disc separate from said hub, said bottom portions of said blades extending between said integral disc and said continuous disc, means attaching said continuous disc and said integral disc together and to said bottom portions while clamping said bottom portions between said discs, said continuous disc preventing bending of said integral disc when said rotor rotates at a high speed.

MORTON B. CURLEY.